(12) United States Patent
Gugau

(10) Patent No.: US 11,220,908 B2
(45) Date of Patent: Jan. 11, 2022

(54) TURBINE WHEEL FOR A TURBINE

(71) Applicant: BorgWarner Inc., Auburn Hills, MI (US)

(72) Inventor: Marc Gugau, Frei-Laubersheim (DE)

(73) Assignee: BorgWarner Inc., Auburn Hills, MI (US)

( * ) Notice: Subject to any disclaimer, the term of this patent is extended or adjusted under 35 U.S.C. 154(b) by 85 days.

(21) Appl. No.: 16/096,024

(22) PCT Filed: Apr. 19, 2017

(86) PCT No.: PCT/US2017/028249
§ 371 (c)(1),
(2) Date: Oct. 24, 2018

(87) PCT Pub. No.: WO2017/189291
PCT Pub. Date: Nov. 2, 2017

(65) Prior Publication Data
US 2019/0136695 A1    May 9, 2019

(30) Foreign Application Priority Data

Apr. 25, 2016    (DE) .................. 10 2016 206 934.9

(51) Int. Cl.
*F01D 5/04*    (2006.01)
*F02C 6/12*    (2006.01)

(52) U.S. Cl.
CPC ............... *F01D 5/048* (2013.01); *F02C 6/12* (2013.01); *F05D 2210/43* (2013.01); *F05D 2220/40* (2013.01); *F05D 2240/303* (2013.01); *F05D 2250/141* (2013.01); *F05D 2250/184* (2013.01); *F05D 2250/232* (2013.01); *F05D 2250/713* (2013.01)

(58) Field of Classification Search
CPC .................................. F01D 5/048; F01D 5/04
See application file for complete search history.

(56) References Cited

U.S. PATENT DOCUMENTS

| | | | |
|---|---|---|---|
| 6,877,955 B2* | 4/2005 | Higashimori | F01D 5/14 415/186 |
| 2011/0252789 A1 | 10/2011 | Kares et al. | |
| 2012/0269635 A1 | 10/2012 | Xu | |
| 2015/0330226 A1* | 11/2015 | Yokoyama | F01D 1/22 416/235 |
| 2019/0040743 A1* | 2/2019 | Yoshida | F02B 39/00 |

FOREIGN PATENT DOCUMENTS

| | | |
|---|---|---|
| DE | 102008045171 A1 | 3/2010 |
| EP | 2940271 A1 | 11/2015 |
| EP | 3401525 A1 | 11/2018 |
| WO | 2016035329 A1 | 3/2016 |

OTHER PUBLICATIONS

International Search Report and Written Opinion dated Aug. 8, 2017, in International Application No. PCT/US2017/028249.
European Office Action dated Oct. 30, 2019, in European Application No. 17720931.9.

* cited by examiner

*Primary Examiner* — Justin D Seabe
(74) *Attorney, Agent, or Firm* — Eric L. Doyle; Stephan A. Pendorf; Patent Central LLC

(57) ABSTRACT

A turbine wheel for a turbine of an exhaust gas turbocharger. The turbine wheel has a base body comprising a back wall and a plurality of turbine blades, connected to the base body, which each comprise a leading edge. The leading edges are designed to be wave shaped.

14 Claims, 2 Drawing Sheets

TURBINE WHEEL FOR A TURBINE

FIELD OF THE INVENTION

The present invention relates to a turbine wheel for a turbine, in particular a turbine of an exhaust gas turbocharger, and an exhaust gas turbocharger with the corresponding turbine.

BACKGROUND INFORMATION

Increasingly more vehicles of the more recent generation are equipped with turbochargers. In order to achieve the target demands and the legal requirements, it is imperative to promote development in the complete drive train and also to optimize the individual components as well as the system as a whole with respect to their reliability and efficiency.

Known turbochargers have a turbine housing, a compressor housing, and a bearing housing which is conventionally connected to the turbine housing on the turbine side and to the compressor housing on the compressor side. A shaft, which supports the turbine wheel and the compressor wheel, is mounted in the bearing housing. During operation, the turbine wheel is driven by the exhaust gas flow. The compressor wheel is then simultaneously set into rotation via the shaft so that the compressor wheel may compress the intake air. The exhaust gas flow is thereby guided in the direction of the turbine wheel via a volute. The turbine wheel generally comprises a main body and turbine blades which have a leading edge. The exhaust gas flow initially strikes the leading edges of the turbine blades and is then deflected along the turbine blades (by which means the turbine wheel is set into rotation) and then leaves the turbine in the axial direction. The form and arrangement of the turbine wheel or the turbine blades and their leading edges is thereby decisive for the effectiveness and efficiency of the turbine, and thus the exhaust gas turbocharger.

The goal of the present invention is to provide a turbine wheel for a turbine of an exhaust gas turbocharger which guarantees a high efficiency of the turbine.

BRIEF SUMMARY OF THE INVENTION

The present invention relates to a turbine wheel for a turbine, in particular a turbine of an exhaust gas turbocharger, and an exhaust gas turbocharger having such a turbine wheel.

The turbine wheel according to the invention has a base body comprising a back wall and a plurality of turbine blades, connected to the base body, which each comprise a leading edge. The leading edges are designed to be wave shaped. The wave-shaped configuration of the leading edge has the advantage that the kinematic energy of the exhaust gas flow may be used more efficiently for driving the turbine wheel and thus simultaneously for driving the compressor. By this means, the efficiency of the turbine, and consequently the entire exhaust gas turbocharger, increases.

In embodiments, the leading edge may be designed with an S-shape. A curve of the shape of the leading edges may have at least one inflection point. The leading edges may have a curve, which begins at the back wall of the base body and has a positive direction counter to the direction of rotation of the turbine wheel, which satisfies the following conditions: (i) the curve has an initial gradient; (ii) the curve has at least one extremum; and (iii) the curve has at least one inflection point. The curve may have an initial positive gradient and have at least one maximum. The at least one inflection point may be provided after the maximum in the direction of rotation x. The curve may additionally have a minimum after the inflection point in the direction of rotation. Alternatively to the initial positive gradient, the curve may have an initial negative gradient and have at least one minimum. The at least one inflection point may be provided after the minimum in the direction of rotation. The curve may additionally have a maximum, a second inflection point, and a second minimum after the inflection point in the direction of the axis of rotation.

In embodiments which are combinable with all previously described embodiments, the leading edges may be designed in such a way that the wave shape of the leading edges may be projected into a plane which is defined by a tangent with respect to the direction of rotation of each leading edge and an axis of rotation of the turbine wheel.

In embodiments which are combinable with all previously described embodiments, the leading edges may lie in an imaginary lateral surface and a contour of each leading edge may have a wave shape in the lateral surface. The lateral surface may be a lateral surface of a cylinder. Alternatively, the lateral surface may be the lateral surface of a cone. The diameter of the cone may be largest at the back wall, wherein the cone tapers extending from the back wall. Alternatively, the diameter of the cone may be smallest at the back wall, and the cone may expand extending from the back wall.

In embodiments which are combinable with all previously described embodiments, a curve of a blade angle of inclination $\theta$ of the turbine blades in the direction of rotation x, which begins at the back wall of the base body and has a positive angle counter to the rotational direction of the turbine wheel, may satisfy the following conditions: (i) $\theta(x)$ has an initial gradient; (ii) $\theta(x)$ has at least one extremum; and (iii) $\theta(x)$ has at least one inflection point. $\theta(x)$ may have an initial positive gradient, have at least one maximum, and the at least one inflection point may be provided after the maximum in the direction of the axis of rotation x. $\theta(x)$ may additionally have a minimum after the inflection point in the direction of the axis of rotation x. Alternatively to the initial positive gradient, $\theta(x)$ may have an initial negative gradient and have at least one minimum. The at least one inflection point may be provided after the minimum in the direction of the axis of rotation x. After the inflection point, $\theta(x)$ may additionally have a maximum, a second inflection point, and a second minimum in the axial direction.

The invention additionally comprises an exhaust gas turbocharger with a compressor and a turbine, wherein the turbine has a turbine wheel according to any one of the previously described embodiments.

DETAILED DESCRIPTION OF THE INVENTION

Embodiments for the turbine wheel according to the invention for a turbine of an exhaust gas turbocharger are subsequently described by way of the figures.

Figure 1:
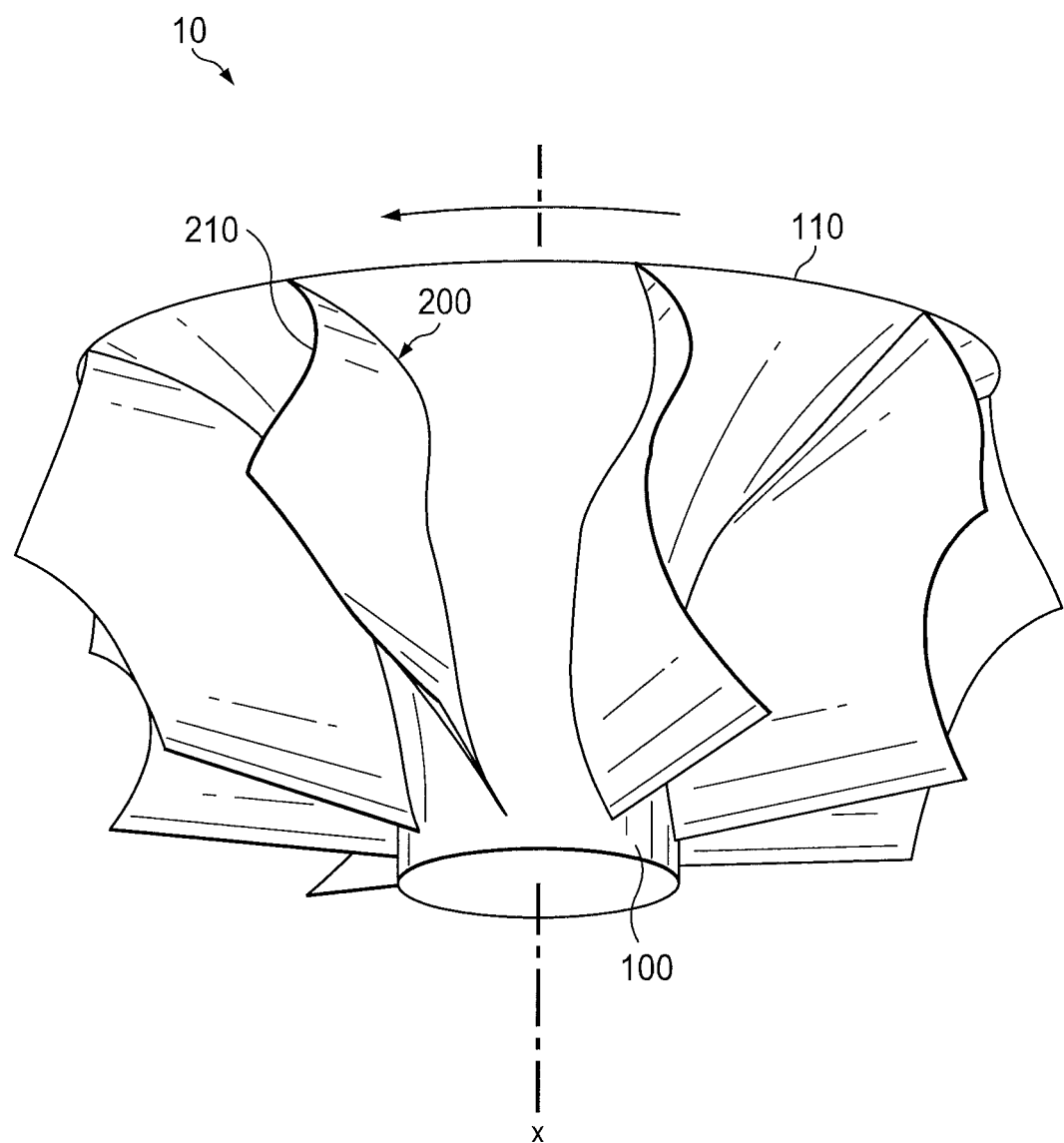
FIG. 1 shows a perspective view of one embodiment of the turbine wheel according to the invention.

FIG. 1 shows a perspective view of a schematic depiction of one embodiment of the turbine wheel according to the invention. Turbine wheel 10 has a base body 100 with a back wall 110. A plurality of turbine blades 200 is arranged on base body 100. The turbine blades each have a leading edge 210. The leading edges 210 are designed with a wave shape (see FIG. 1 and FIG. 2 lower left). Leading edge 210 designates that part of the outer edge of a turbine blade 200 which in the installed state in not directly surrounded outwardly by the turbine housing in the radial direction (r in the two upper views in FIG. 2), but instead runs openly counter to the exhaust gas flow coming out of the volute. This means, leading edges 210 are the edge sections of turbine blades 200 facing the inflowing exhaust gas. In the upper left view of FIG. 2, the area of leading edge 210 (more specifically its axial extension relative to the axis of rotation x of the turbine wheel) is designated with b. The wave-shaped configuration of leading edge 210 has the advantage that the kinematic energy of the exhaust gas flow may be exploited more efficiently for driving turbine wheel 10 and thus may also be used for the function of the compressor. By this means, the efficiency of the turbine, and consequently the entire exhaust gas turbocharger, increases.

Leading edges 210 may, for example, be configured with an S-shape. S-shaped means, in particular, an extended S-shape beginning from back wall 110 of turbine wheel 10 without undercuts (see FIG. 1 and FIG. 2 lower left). S-shaped leading edge 210 does not thereby have to form a complete S (no undercuts) and also need not be configured symmetrically. The wave shape or S-shaped form also does not have to extend over the entire length of leading edge 210. Thus, a wave shape or S-shaped area may also include an area with a different shape, for example, with a straight line.

Figure 2:
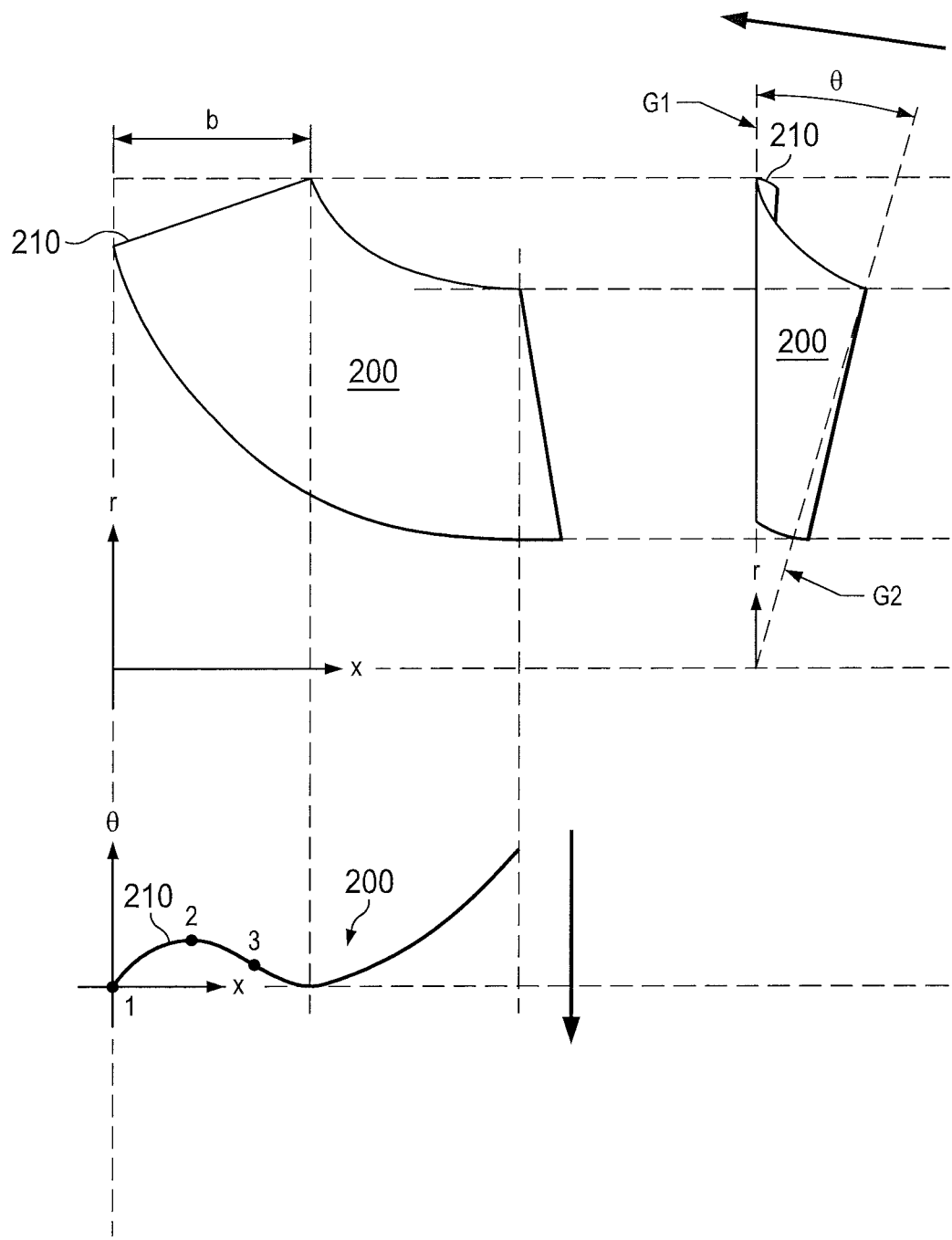
FIG. 2 shows a side view, a front view, and a top view of a turbine blade of one embodiment of the turbine wheel according to the invention.

As indicated in FIG. 1 and is perceived more clearly in FIG. 2 lower left, the curved shape of leading edges 210 has an inflection point 3. The curve may also have more than one inflection point. Leading edge 210 of FIG. 2 lower left has, in particular a curve, which begins at back wall 110 of base body 100 and has a positive direction counter to the direction of rotation of the turbine wheel (the direction of rotation is indicated by arrows in FIG. 1 and FIG. 2, top right and lower left), and satisfies the following conditions:

(i) The curve has an initial gradient;
(ii) The curve has at least one extremum 2; and
(iii) The curve has at least one inflection point 3.

The curve of the embodiment shown in FIG. 2 has an initial positive gradient and has a maximum 2. Inflection point 3 is provided after maximum 2 in the direction of axis of rotation x. The curve additionally has a minimum at the end of leading edge 210. Alternatively to the initial positive gradient, the curve may have an initial negative gradient and have at least one minimum. The at least one inflection point is then provided after the minimum in the direction of the axis of rotation. Furthermore, after the inflection point, the curve may additionally have a maximum, a second inflection point, and a second minimum in the direction of axis of rotation x.

In particular, leading edges 210 are designed in such a way that the wave shape of leading edges 210 may be projected into a plane, which is defined by a tangent with respect to the direction of rotation of each leading edge 210 and axis of rotation x of turbine wheel 10. The depiction in the lower left of FIG. 2 corresponds to a view of the leading edge in such a projection: a coordinate system which defines the respective plane (a corresponding plane for each blade) has a first axis along axis of rotation x of turbine wheel 10 with a positive direction arising from back wall 110 in the direction of the turbine blades and a to second axis along the respective tangent to the direction of rotation (see arrow in FIG. 2 lower left), which a positive direction counter to the direction of rotation of turbine wheel 10. In other words: leading edge 210 of turbine wheel 10 has a wave shape, when viewed in the flow direction, perpendicular to the direction of rotation, and perpendicular to axis of rotation x of turbine wheel 10.

Alternatively of simultaneously, the shape and orientation of leading edge 210 may satisfy the following conditions: leading edge 210 lies in an imaginary lateral surface and the contour of each leading edge 210 in the lateral surface may have a wave shape. The lateral surface may be, for example, a lateral surface of a cylinder. Alternatively, the lateral surface in which leading edges 210 lie may be the lateral surface of a cone. In the example of leading edge 210 shown in FIG. 2 top left, the lateral surface is conical and the diameter of the cone is smallest at back wall 110. The cone expands extending from back wall 110 (In FIG. 2 top left: positive increase of leading edge 210 in area b along axis of rotation x in the side view projection). Alternatively, the diameter of the cone may be largest at back wall 110, wherein the cone tapers extending from back wall 110. When projected into a side view plane, which is defined by axis of rotation x and radial direction r (parallel to the back wall), the leading edge may thus run either parallel to axis or rotation x or inclined to axis of rotation x (as shown in FIG. 2). An inclined curve means that leading edge 210, when viewed in the side view plane, either initially increases or decreases from the back wall (see depiction top left in FIG. 2, which shows an increasing curve of leading edge 210).

In other words, the shape and orientation of leading edge 210 may also be defined using the following conditions for the curve of a blade angle of inclination (θ) (see FIG. 2 top right and lower left as ordinate axes) of turbine blade 200 in the direction of axis of rotation x, which begins at back wall 110 of base body 100 and has a positive angle counter to the direction of rotation of turbine wheel 10:

(i) θ(x) has an initial gradient;
(ii) θ(x) has at least one extremum 2; and
(iii) θ(x) has at least one inflection point 3.

Blade angle of inclination θ describes the inclination of turbine blade 200 at an arbitrary point of turbine blade 200 with respect to, for example, an origin position of turbine blade 200 from back wall 110. The two legs which enclose blade angle of inclination θ may be defined as follows: the first stationary leg is defined by a first straight line G1 (congruent with r in the top right depiction of FIG. 2), which stands perpendicular to axis of rotation x of turbine wheel 10, wherein first straight line G1 connects axis of rotation x to an intersection point (point 1 in the lower left depiction of FIG. 2) of leading edge 210 with back wall 110. The second leg is determined by a projection of a second straight line G2 in a plane which runs perpendicular to axis of rotation x, and the first stationary leg lies in this plane. Second straight line G2 stands in turn perpendicular to axis of rotation x and connects axis of rotation to an arbitrarily selected point on the radial outer edge of each turbine blade 200. The two legs thus derived then define blade angle of inclination θ of turbine blade 200 at the selected point and with respect to the stationary first leg (intersection point of leading edge 210 with back wall 110). Blade angle of inclination θ may thus be determined for any arbitrary point over the entire curve of the blade edge (and not only for area b of leading edge 210). In FIG. 2, in the top right depiction, angle θ is plotted for the outermost point, in the direction of axis of rotation x, of the radial outer edge of turbine blade 200. The lower left depiction shows the curve of angle θ plotted across axis of rotation x. The curve represents θ(x). In FIG. 2, lower left, an embodiment of turbine wheel 10 is shown, which has a leading edge 210 in area b of blade 200, which has its origin at point 1 (emergence from back wall 110) and θ(x) has, after an initial positive gradient, a (local) maximum at point 2 and has an inflection at point 3. A minimum is indicated at the end of the leading edge.

Alternatively to the initial positive gradient, θ(x) may have an initial negative gradient and at least one minimum. The inflection point is then provided after the minimum in the direction of axis of rotation x. After the inflection point, θ(x) may additionally have a maximum, a second inflection point, and a second minimum in the axial direction.

The invention additionally comprises an exhaust gas turbocharger with a compressor and a turbine, wherein the turbine has a turbine wheel 10 according to any one of the previously described embodiments.

Although the present invention has been described above and is defined in the attached claims, it should be understood that the invention may also be alternatively defined according to the following embodiments:

1. A turbine wheel (10) for a turbine, in particular a turbine for an exhaust gas turbocharger, comprising
    a base body (100) with a back wall (110); and
    a plurality of turbine blades (200), connected to the base body (100),
    which each have a leading edge (210);
    characterized in that the leading edge (210) is designed with a wave shape.
2. The turbine wheel according to Embodiment 1, characterized in that the leading edge (210) is designed with an S-shape.
3. The turbine wheel according to Embodiment 1 or Embodiment 2, characterized in that a curve of the shape of the leading edges (210) has at least one inflection point (3).
4. The turbine wheel according to any one of the preceding embodiments, characterized in that the leading edge (210) has a curve which, beginning at the back wall (110) of the base body (100) and with a positive direction counter to the direction of rotation of the turbine wheel, satisfies the following conditions:
    (i) The curve has an initial gradient;
    (ii) The curve has at least one extremum (2); and
    (iii) The curve has at least one inflection point (3).
5. The turbine wheel according to Embodiment 4, characterized in that the curve has an initial positive gradient, has at least one maximum (2), and has at least one inflection point (3) provided after the maximum (2) in the direction of the axis of rotation (x).
6. The turbine wheel according to Embodiment 5, characterized in that the curve additionally has a minimum after the inflection point (3) in the direction of the axis of rotation (x).
7. The turbine wheel according to Embodiment 4, characterized in that the curve has an initial negative gradient, has at least one minimum, and at least one inflection point is provided after the minimum in the direction of the axis of rotation (x).
8. The turbine wheel according to Embodiment 7, characterized in that after the inflection point, the curve additionally has a maximum, a second inflection point, and a second minimum in the direction of the axis of rotation.
9. The turbine wheel according to any one of the preceding embodiments, characterized in that the leading edges (210) are designed in such a way that the wave shape of the leading edges (210) may be projected into a plane which is defined be a tangent with respect to the direction of rotation of the respective leading edge (210) and an axis of rotation of the turbine wheel (10).
10. The turbine wheel according to any one of the preceding embodiments, characterized in that the leading edges (210) lie in an imaginary lateral surface, and a contour of the respective leading edge (210) has the wave shape in the lateral surface.
11. The turbine wheel according to Embodiment 10, characterized in that the lateral surface is a lateral surface of a cylinder.
12. The turbine wheel according to Embodiment 10, characterized in that the lateral surface is the lateral surface of a cone, and
    wherein the diameter of the cone may be largest at the back wall (110), and the cone tapers extending from the back wall (110), or
    wherein the diameter of the cone may be smallest at the back wall (110), and the cone expands extending from the back wall (110).
13. The turbine wheel according to any one of the preceding embodiments, characterized in that a curve of a blade angle of inclination (θ) of the turbine blades (200), which runs in the direction of the axis of rotation (x) beginning at the back wall (110) of the base body (100) and has a positive angle counter to the direction of rotation of the turbine wheel (10), satisfies the following conditions:
    (i) θ(x) has an initial gradient;
    (ii) θ(x) has at least one extremum (2); and
    (iii) θ(x) has at least one inflection point (3).
14. The turbine wheel according to Embodiment 13, characterized in that θ(x) has an initial positive gradient, has at least one maximum (2), and the at least one inflection point (3) is provided after the maximum (2) in the direction of the axis of rotation (x).
15. The turbine wheel according to Embodiment 14, characterized in that θ(x) additionally has a minimum after the inflection point (3) in the direction of the axis of rotation (x).
16. The turbine wheel according to Embodiment 13, characterized in that θ(x) has an initial negative gradient, has at least one minimum, and the at least one inflection point is provided after the minimum in the direction of the axis of rotation (x).
17. The turbine wheel according to Embodiment 16, characterized in that θ(x) additionally has a maximum after the inflection point in the direction of the axis of rotation (x).
18. An exhaust gas turbocharger comprising a compressor and a turbine, characterized in that the turbine has a turbine wheel according to any one of Embodiments 1 through 17.

The invention claimed is:
1. A turbine wheel (10) for a turbine of an exhaust gas turbocharger comprising
    a base body (100) with a back wall (110); and
    a plurality of turbine blades (200), connected to the base body (100), which each have a leading edge (210),
    wherein the leading edge (210) has a wave shape, and
    wherein the leading edges (210) have a curve which, beginning from the back wall (110) of the base body (100) and with a positive direction counter to the direction of rotation of the turbine wheel, satisfies the following conditions:
    (i) the curve has an initial gradient;
    (ii) the curve has at least one extremum (2); and
    (iii) the curve has at least one inflection point (3).

2. The turbine wheel according to claim 1, wherein the curve has a positive gradient in the beginning, has at least one maximum (2), and the at least one inflection point (3) is provided after the maximum (2) in the direction of the axis of rotation (x).

3. The turbine wheel according to claim 2, wherein the curve additionally has a minimum after the inflection point (3) in the direction of the axis of rotation (x).

4. The turbine wheel according to claim 1, wherein the curve has a negative gradient in the beginning, has at least one minimum, and the at least one inflection point is provided after the minimum in the direction of the axis of rotation (x).

5. The turbine wheel according to claim 1, wherein the wave shape of the leading edges (210) can be projected into a plane which is defined be a tangent with respect to the direction of rotation of the respective leading edge (210) and an axis of rotation of the turbine wheel (10).

6. The turbine wheel according to claim 1, wherein the leading edge (210) lies in an imaginary lateral surface, and a contour of the respective leading edge (210) has the wave shape in the lateral surface.

7. The turbine wheel according to claim 6, wherein the lateral surface is the lateral surface of a cone, and wherein the diameter of the cone is largest at the back wall (110), and the cone tapers extending from the back wall (110), or wherein the diameter of the cone is smallest at the back wall (110), and the cone expands extending from the back wall (110).

8. The turbine wheel according to claim 1, wherein a curve of a blade angle of inclination (θ) of the turbine blades (200), which runs in the direction of the axis of rotation (x) beginning at the back wall (110) of the base body (100) and has a positive angle counter to the direction of rotation of the turbine wheel (10), satisfies the following conditions:

(i) (x) has an initial gradient;
(ii) (x) has at least one extremum (2); and
(iii) (x) has at least one inflection point (3).

9. The turbine wheel according to claim 8, wherein (x) has an initial positive gradient, has at least one maximum (2), and the at least one inflection point (3) is provided after the maximum (2) in the direction of the axis of rotation (x).

10. viously presented) The turbine wheel according to claim 9, wherein (x) additionally has a minimum after the inflection point (3) in the direction of the axis of rotation (x).

11. The turbine wheel according to claim 8, wherein (x) has an initial negative gradient, has at least one minimum, and wherein the at least one inflection point is provided after the minimum in the direction of the axis of rotation (x); in particular wherein, after the inflection, (x) additionally has a maximum, a second inflection point, and a second minimum in the axial direction.

12. An exhaust gas turbocharger comprising a compressor and a turbine, wherein the turbine has a turbine wheel according to claim 1.

13. The turbine wheel according to claim 1, wherein the curve has a negative gradient in the beginning, has at least one minimum, and the at least one inflection point is provided after the minimum in the direction of the axis of rotation (x); wherein, after the inflection point, the curve additionally has a maximum, a second inflection point, and a second minimum in the direction of the axis of rotation (x).

14. A turbine wheel (10) Bar a turbine of an exhaust gas turbocharger comprising a base body (100) with a back wall (110); and a plurality of turbine blades (200), connected to the base body (100), which each have a leading edge (210), wherein the leading edge (210) has a wave shape, wherein the leading edges (210) have a curve which satisfies the following conditions in a coordinate system having a first axis along an axis of rotation (x) of the turbine wheel (10) with a positive direction beginning from the back wall (110) of the base body (100) in the direction of the turbine blades, and having a second axis along a respective tangent to a direction of rotation of the turbine wheel (10) with a positive direction counter to the direction of rotation of the turbine wheel (10), and wherein (i) the curve has an initial gradient;
(ii) the curve has at least one extremum (2); and
(iii) the curve has at least one inflection point (3).

* * * * *